US011095625B2

(12) United States Patent
Chen et al.

(10) Patent No.: US 11,095,625 B2
(45) Date of Patent: Aug. 17, 2021

(54) DATA OBJECTS ASSOCIATED WITH PRIVATE SET INTERSECTION (PSI)

(71) Applicant: ENTIT SOFTWARE LLC, Sanford, NC (US)

(72) Inventors: Liqun Chen, Bristol (GB); Stuart Haber, Princeton, NJ (US); Tomas Sander, Princeton, NJ (US)

(73) Assignee: Micro Focus LLC, Santa Clara, CA (US)

( * ) Notice: Subject to any disclaimer, the term of this patent is extended or adjusted under 35 U.S.C. 154(b) by 230 days.

(21) Appl. No.: 16/084,408

(22) PCT Filed: Mar. 18, 2016

(86) PCT No.: PCT/US2016/023259
§ 371 (c)(1),
(2) Date: Sep. 12, 2018

(87) PCT Pub. No.: WO2017/160317
PCT Pub. Date: Sep. 21, 2017

(65) Prior Publication Data
US 2019/0075088 A1    Mar. 7, 2019

(51) Int. Cl.
*H04L 29/06* (2006.01)
*H04L 29/08* (2006.01)
(Continued)

(52) U.S. Cl.
CPC .... *H04L 63/0442* (2013.01); *G06F 16/24558* (2019.01); *G06F 21/00* (2013.01);
(Continued)

(58) Field of Classification Search
CPC ..... H04L 63/0442; H04L 9/008; H04L 9/085; H04L 29/08; H04L 63/0428;
(Continued)

(56) References Cited

U.S. PATENT DOCUMENTS

| 8,526,603 B2 | 9/2013 | Kerschbaum |
| 8,572,405 B2 | 10/2013 | Kerschbaum |

(Continued)

OTHER PUBLICATIONS

Tajima, "Outsourced Private Set Intersection Cardinality with Fully Homomorphic Encryption", 2018, IEEE, pp. 1-8 (Year: 2018).*

(Continued)

*Primary Examiner* — Taghi T Arani
*Assistant Examiner* — Gregory A Lane

(57) ABSTRACT

Examples disclosed herein relate to data objects associated with private set intersection (PSI). Some examples disclosed herein may enable identifying a set of server elements and a set of data objects. Each data object of the set of data objects may be associated with at least one server element of the set of server elements. Some examples further enable sending the set of server elements and the set of data objects to a client computing device that has a set of client elements. A private set intersection (PSI) between the set of server elements and the set of client elements may be inaccessible by the client computing device, and a subset of the set of data objects that are associated with the PSI may be accessible by the client computing device.

20 Claims, 7 Drawing Sheets

(51) Int. Cl.
    *G06F 21/55*     (2013.01)
    *G06F 16/2455*     (2019.01)
    *G06F 21/00*     (2013.01)
    *G06F 21/62*     (2013.01)
    *G06F 21/60*     (2013.01)
    *H04L 9/00*     (2006.01)
    *H04L 9/08*     (2006.01)

(52) U.S. Cl.
    CPC ............ *G06F 21/55* (2013.01); *G06F 21/602* (2013.01); *G06F 21/62* (2013.01); *G06F 21/6227* (2013.01); *H04L 9/008* (2013.01); *H04L 9/085* (2013.01); *H04L 29/08* (2013.01); *H04L 63/0428* (2013.01); *H04L 63/0435* (2013.01)

(58) Field of Classification Search
    CPC ........... H04L 68/0435; G06F 16/24558; G06F 21/00; G06F 21/55; G06F 21/602; G06F 21/6227
    USPC ......................................................... 713/150
    See application file for complete search history.

(56) References Cited

U.S. PATENT DOCUMENTS

| | | | |
|---|---|---|---|
| 9,003,486 | B2 | 4/2015 | Asokan et al. |
| 9,158,925 | B2 | 10/2015 | Kamara |
| 2005/0262563 | A1* | 11/2005 | Mahone ................. G06F 21/55 726/22 |
| 2013/0227273 | A1 | 8/2013 | Di Crescenzo |
| 2013/0246802 | A1 | 9/2013 | Kerschbaum |
| 2014/0081980 | A1 | 3/2014 | Aad |
| 2015/0149763 | A1* | 5/2015 | Kamara .............. H04L 63/0428 713/150 |
| 2015/0161398 | A1 | 6/2015 | De Cristofaro et al. |

OTHER PUBLICATIONS

Fredudiger, J., et al., Privacy-friendly Collaboration for Cyber Threat Mitigation, Nov. 23, 2014, 12 pages, <http://arxiv.org/pdf/1403.2123.pdf>.

International Searching Authority., International Search Report and Written Opinion dated Dec. 6, 2016 for PCT Application No. PCT/US2016/023259, Filed Mar. 18, 2016, 13 pages.

* cited by examiner

DATA OBJECTS ASSOCIATED WITH PRIVATE SET INTERSECTION (PSI)

BACKGROUND

A private set intersection (PSI) protocol may enable two parties to share the data that is common to the first party's input set and the second party's input set without disclosing the input sets to each other. The PSI protocol may be applied to privacy-preserving data sharing, for example. The two parties may compute an intersection (also referred to herein as a PSI) of their input sets without revealing the elements of their sets to each other. For example, the PSI protocol may compute an intersection of two input sets, including one from a server computing device and the other from a client computing device. The se computing device and/or client computing device may learn (e.g., have access to) the intersection (e.g., the elements in the intersection) without learning any information about the other computing devices input set beyond the size of the input set.

DESCRIPTION OF THE DRAWINGS

The following detailed description references the drawings, wherein.

DETAILED DESCRIPTION

Figure 1:
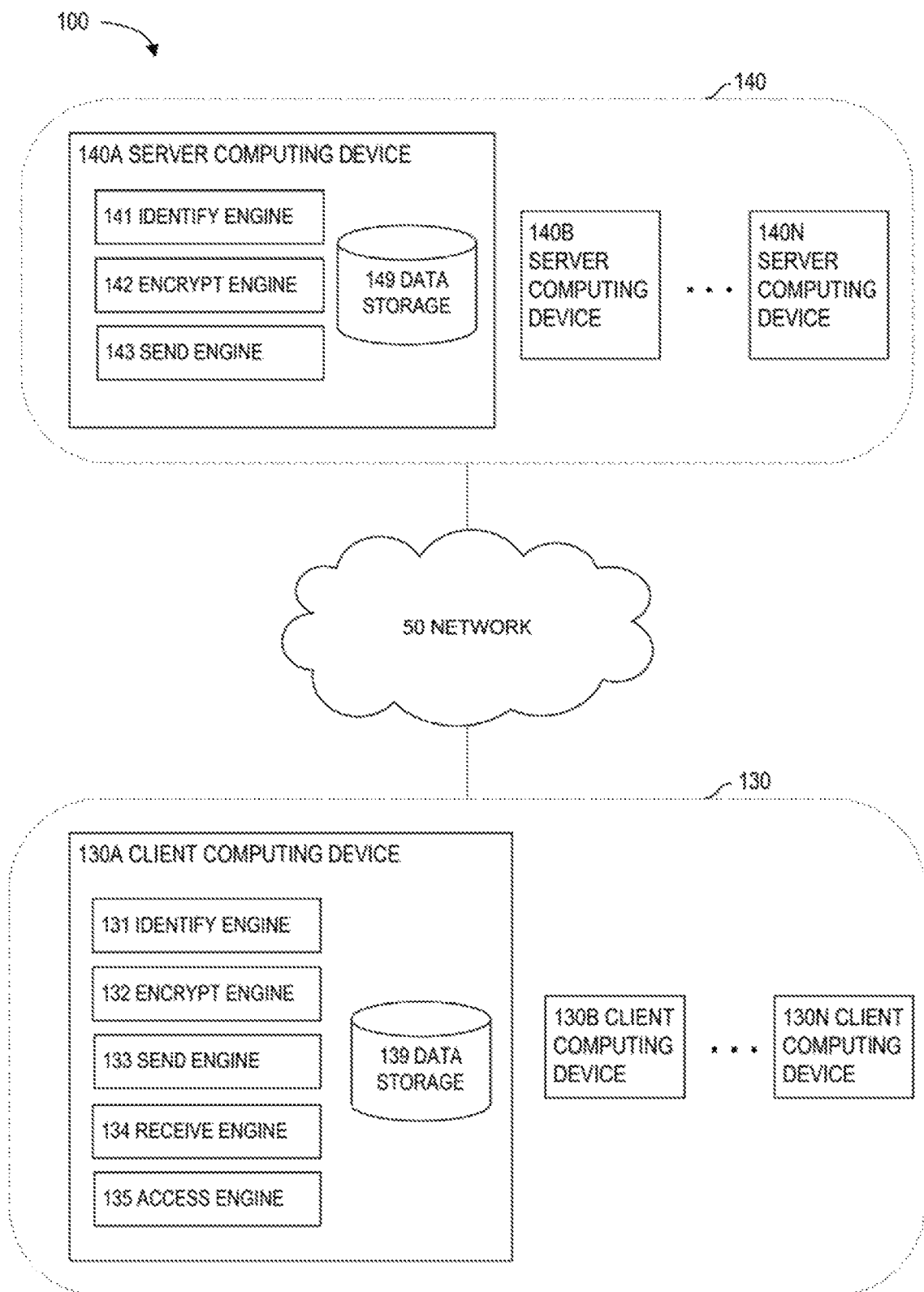
FIG. 1 is a block diagram depicting an example system for accessing data objects associated with private set intersection (PSI).

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

A private set intersection (PSI) protocol may enable two parties to share the data that is common to the first party's input set and the second party's input set without disclosing the input sets to each other. The PSI protocol may be applied to privacy-preserving data sharing, for example. The two parties may compute an intersection (also referred to herein as a PSI) of their input sets without revealing the elements of their sets to each other. For example, the PSI protocol may compute an intersection of two input sets, including one from a server computing device and the other from a client computing device. The server computing device and/or client computing device may learn (e.g., have access to) the intersection (e.g., the elements in the intersection) without learning any information about the other computing device's input set beyond the size of the input set.

However, in some instances, it may be desired to share and/or have access to data objects associated with the PSI while hiding and/or blocking the access to the actual elements in the PSI. This technique may be useful, for example, in the context of a security information sharing platform that enables sharing of security information among a plurality of users. Users of the security information sharing platform share security indicators, security alerts, and/or other security-related information (e.g., mitigations strategies, attackers, attack campaigns and trends, threat intelligence information, etc.) With other users in an effort to advise the other users of any security threats, or to gain information related to security threats from other users. The other users with whom the security information is shared typically belong to a community that is selected by the user for sharing, or to the same community as the user. The other users of h communities may further share the security information with further users and/or communities. A "user," as used herein, may include an individual, organization, or any entity that may send, receive, and/or share the security information. A community may include a plurality of users. For example, a community may include a plurality of individuals in a particular area of interest. A community may include a global community where any user may join, for example, via subscription. A community may also be a vertical-based community. For example, a vertical-based community may be a healthcare or a financial community A community may also be a private community with a limited number of selected users.

In some situations, a private community (e.g., on client computing device) may be investigating a major attack campaign. The users of the community may privately exchange and/or share any security indicators within the community. The community may wish to know if the security information sharing platform (e.g., on a server computing device) has any information about threat actors associated with this campaign (e.g., threat actors behind the security indicators in the campaign). However, revealing the security indicators that are privately shared within the community to the security information sharing platform may be inacceptable or undesirable. In addition, the platform needs to prevent its threat intelligence information from uncontrolled dispersion. It is technically challenging to have the private community to be able to access the information about the threat actors without revealing the security indicators at issue. It is also technically challenging to have the platform to ensure the confidentiality of its indicators that are in fact associated with the threat actors. In some cases, not disclosing these indicators may even be required by law (e.g., for classified data).

Examples disclosed herein provide technical solutions to these technical challenges by providing a technique to access data objects (e.g., threat actors in the example above) associated with PSI. Some examples disclosed herein may enable identifying a set of server elements and a set of data objects. Each data object of the set of data objects may be associated with at least one server element of the set of server elements. Some examples further enable sending the set of server elements and the set of data objects to a client computing device that has a set of client elements. A private set intersection (PSI) between the set of server elements and the set of client elements may be inaccessible by the client computing device, and a subset of the set of data objects that are associated with the PSI may be accessible by the client computing device.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is a block diagram depicting an example system 100 for sending data objects associated with private set intersection (PSI).

The various components may include client computing devices 130 (illustrated as 130A, 130B, . . . , 130N) and server computing devices 140 (illustrated as server computing device 140A, 140B, . . . , 140N). Each client computing device 130A, 130B, . . . , 130N may communicate requests to and/or receive responses from server computing devices 140. Server computing devices 140 may receive and/or respond to requests from client computing devices 130. Client computing devices 130 may include any type of computing device providing a user interface through which a user can interact with a software application. For example, client computing devices 130 may include a laptop computing device, a desktop computing device, an all-in-one computing device, a thin client, a workstation, a tablet computing device, a mobile phone (e.g., smartphone), an electronic book reader, a network-enabled appliance such as a "Smart" television, and/or other electronic device suitable for execution of the functionality described below. Server computing device 140 may comprise a single computing device or any number of integrated or distributed computing devices serving at least one software application for consumption by client computing devices 130.

The various components (e.g., components 130 and or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

According to various implementations, system 100 and the various components described herein may be implemented in hardware and/or programming that configures hardware. Furthermore, in FIG. 1 and other Figures described herein, different numbers of components or entities than depicted may be used.

As detailed below, server computing device 140 may comprise an identify engine 141, an encrypt engine 142, a send engine 143, and/or other engines. The term "engine", as used herein, refers to a combination of hardware and programming that performs a designated function. As is illustrated respect to FIGS. 3-5, the hardware of each engine, for example, may include one or both of a processor and a machine-readable storage medium, while the programming is instructions or code stored on the machine-readable storage medium and executable by the processor to perform the designated function.

Identify engine 141 may identify a set of server elements and a set of data objects. Server computing device 140 may store the set of server elements and/or the set of data objects in a data storage (e.g., data storage 149). Each data object of the set of data objects may be associated with at least one server element of the set of server elements. Although the set of server elements and the set of data objects are depicted as separate sets, the set of server elements and the set of data objects may also represent a single set that comprises the server elements and data objects. For example, server computing device 140 may have a set of pairs, a set denoted by S, where S={$(s\_1, g\_1), (s\_2, g\_2), \ldots, (s\_m, g\_m)$}. The set of server elements may comprise a first server element (e.g., $s\_1$), a second server element, (e.g., $s\_2$), . . . , and a $m^{th}$ server element (e.g., $s\_m$). The set of server elements has a total of m server elements. The set of data objects may comprise a first data object (e.g., $g\_1$), a second data object (e.g., $g\_2$), . . . , and a $m^{th}$ data object (e.g., $g\_m$).

In some implementations, sewer computing device 140 may represent a security information sharing platform that enables sharing of security information among a plurality of users. Users of the security information sharing platform share security indicators, security alerts, and/or other security-related information (e.g., mitigations strategies, attackers, attack campaigns and trends, threat intelligence information, etc.) with other users in an effort to advise the other users of any security threats, or to gain information related to security threats from other users. The other users with whom the security information is shared typically belong to a community that is selected by the user for sharing, or to the same community as the user. The other users of such communities may further share the security information with further users and/or communities. A "user," as used herein, may include an individual, organization, or any entity that may send, receive, and/or share the security information.

In these implementations, a particular server element of the set of server elements may represent a particular security indicator that comprises at least one observable. A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus. An "observable," as used herein, may refer to an event pertinent to the operation of computers and networks (e.g., an event occurring in network, servers, applications, databases, and/or various components of any computer system). Examples of an observable may include but not be limited to: an IP address, a domain name, an e-mail address, Uniform Resource Locator (URL), and a software file hash. A security indicator may comprise a single observable (e.g., "a new file is created by an executable") or a plurality of observables (e.g., "a new file is created by an executable and "the executable connects to domain X").

A security indicator may be created by and/or originated from at least one of a plurality of source entities. For example, the plurality of source entities may include a user (e.g., analysts and/or community members of the security information sharing platform). A security indicator may be manually created and/or added to the security information sharing platform by the user. In another example, the plurality of source entities may include a threat intelligence provider that provides threat intelligence feeds and/or any other participating organizations. A security indicator that is found in the intelligence feeds and/or information from other participating organizations, for example, may be automatically created and/or added to the security information sharing platform. There exist a number of providers of threat intelligence feeds. The threat intelligence feeds may be provided by independent third parties such as security service providers. These providers and/or sources may supply the threat intelligence feeds that provide information about threats the providers have identified. Most threat intelligence feeds, for example, include lists of domain names, IP addresses, and URLs that various providers have classified as malicious or at least suspicious according to different methods and criteria. In another example, the plurality of source entities may include a third-party researcher or analyst.

In these implementations, a particular data object that is associated with the particular server element may represent some contextual information related to the particular security indicator. Examples of the information related to the security indicator may include but are not limited to an indicator score associated with the security indicator, information related to a source entity of the indicator (e.g., identification of the source entity, level of source reliability associated with the source entity, level of source authenticity associated with the source entity, etc.), a level of severity (e.g., the level of severity that the indicator may pose) associated with the security indicator, and information related to an observable in the security indicator (e.g., information related to a source entity that provided the observable, sightings of the observable), a threat actor for the security indicator (e.g., attacker behind the threat indicated in the security indicator), a domain name, a timestamp, a campaign, a technique/tactic/procedure (TTP), and a group that the security indicator belongs to (e.g., an organization, an industry sector, a community of the security information sharing platform, etc.).

In some implementations, identify engine 141 may identify a set of client elements of client computing device 130. For example, identify engine 141 may receive the set of client elements from client computing device 130. Client computing device 130 may encrypt the set of client elements before sending them to server computing device 140, as discussed herein with respect to encrypt engine 132. The set of client elements may be denoted by a set C where C={$(c\_1, c\_2, \ldots, c\_n)$}. The set of client elements may comprise a first client element (e.g., $c\_1$), a second client element, (e.g., $c\_2$), ..., and a $n^{th}$ client element (e.g., $c\_n$). The set of client elements has a total of n client elements. Returning to the above example related to the security information sharing platform, a particular client element of the set of client elements may represent a particular security indicator. In some situations, some client elements in the set of client elements may be identical to and/or match some server elements in the set of server elements. For example, $s\_1$ and $c\_2$ may be the same element (e.g., the identical security indicator). In another example, $s\_4$ and $c\_20$ may refer to the identical element whereas $s\_5$ is unique to server computing device 140 (e.g., in other words, the set of client elements do not have an element identical to $s\_5$). This matching subset of the two sets may be referred to herein as an intersection and/or a private set intersection (PSI). In mathematics, the PSI can be denoted by the symbol "∩" where C ∩ S of two sets C and S is the set that contains all elements of C that also belong to S (or equivalently, all elements of S that also belong to C), but not other elements. For example, a PSI between the set of server elements and the set of client elements may comprise a subset of the set of server elements and a subset of the set of client elements where each server element of the subset of the set of server elements has an identical client element in the subset of the set of client elements.

In some implementations, identify engine 141 may identify a threshold condition for the set of server elements. A threshold condition may specify a condition that should be satisfied for client computing device 130 to gain access to a data object that is associated with the PSI, which is discussed herein with respect to access engine 135. For example, the set denoted by S, may comprise {$(s\_1\_1, s\_1\_2, \ldots, s\_\_I_1, g\_1, t\_1), (s\_2\_1, s\_2\_2, \ldots, s\_2\_I_2, g\_2, t\_2), \ldots, (s\_m\_1, s\_m\_2, \ldots, s\_m\_I_m, g\_m, t\_m)$} where the set of server elements include $s\_1$ (e.g., including $s\_1\_1, s\_1\_2, \ldots, s\_1\_I_1$), $s\_2$ (e.g., including $s\_2\_1, s\_2\_2, \ldots, s\_2\_I_2$), \ldots, $s\_m$ (e.g., including $s\_m\_1, s\_m\_2, \ldots, s\_m\_I_m$), and the set of data objects include $g\_1, g\_2, \ldots, g\_m$. In this example, a threshold condition $t\_1$ may set a threshold condition for the server element $s\_1$, a threshold condition $t\_2$ may set a threshold condition for the server element $s\_2$, and a threshold condition $t\_3$ set a threshold condition for the server element $s\_3$, and so on.

Encrypt engine 142 may encrypt the set of server elements, the set of data objects, the set of client elements (e.g., the set of client elements that are received from client computing device 130 where the set of client elements may have been encrypted by client computing device 130), a set of threshold conditions, or any combination thereof. Note that the aforementioned sets (or any subset thereof) may be encrypted separately or together. For example, the set of server elements may be encrypted separately from the set of data objects. A subset of the set of server elements may be encrypted separately from another subset of the set of server elements. The set of server elements (or any subset thereof) may be encrypted together with the set of data objects (or any subset thereof). Similarly, the set of server elements may be encrypted separately from the set of client elements. A subset of the set of client elements may be encrypted separately from another subset of the set of client elements. The set of server elements (or any subset thereof) may be encrypted together with the set of client elements (or any subset thereof).

In some implementations, encrypt engine 142 may encrypt the aforementioned sets (or any subset thereof) using different encryption schemes. In one example, encrypt engine 142 may encrypt the set of data objects using a symmetric key, and encrypt the set of server elements using an asymmetric encryption key that was used by client computing device 130 to encrypt the set of client elements. As further discussed herein with respect to access engine 135, the symmetric key may be retrieved by client computing device 130 from the set of server elements to decrypt a particular data object if the particular data object is associated with the PSI (e.g., the PSI between the set of server elements and the set of client elements).

In some implementations, encrypt engine 142 ray encrypt the aforementioned sets (or any subset thereof) using the same encryption schemes. In one example, encrypt engine 142 may encrypt the set of server elements and the set of data objects using a homomorphic encryption scheme. The same homomorphic encryption scheme may be also used by client computing device 130 to encrypt the set of client elements. Consider the following example: Client computing device 130 encrypts the set of client elements using an additively homomorphic encryption scheme, and sends the encrypted set of client elements to server computing device 140. Server computing device 140 may encrypt the data objects using a symmetric, authenticated encryption scheme (e.g., a random symmetric key). Server computing device 140 may encrypt the set of server elements and the set of data objects together using the additively homomorphic encryption scheme (e.g., the same scheme that was used to encrypt the set of client elements). As further discussed herein with respect to access engine 135, this encryption of the set of server elements and data objects may be done in such a manner that, if decrypted by client computing device 130 using the additively homomorphic encryption scheme, client computing device 130 may retrieve a particular data object if the particular data object is associated with the PSI. On the other hand, client computing device 130 may retrieve a random value if the particular data object is not associated with the PSI.

Send engine 143 may send, to client computing device 130, the se server elements, the set of data objects, the set of client elements (e.g., the set of client elements that are received from client computing device 130 where the set of client elements may have been encrypted by client computing device 130), a set of threshold conditions, or any combination thereof. The aforementioned sets (or any subset thereof) may be encrypted by encrypt engine 142, as discussed above, before sending them to client computing device 130. Referring to FIG. 1, send engine 143 may send the aforementioned sets (or any subset thereof) from server computing device 140 to client computing device 130 via network 50.

In some implementations, send engine 143 may randomize an order the order of how the data in the sets are arranged) of the aforementioned sets (or any subset thereof) before sending them to client computing device 130. For example send engine 143 may shuffle and/or permutes the data in the sets to be sent to further avoid any unintended disclosure of the sets to client computing device 130.

As detailed below, client computing device 130 may comprise an identify engine 131, an encrypt engine 132, a send engine 133, a receive engine 134, an access engine 135, and/or other engines.

Identity engine 131 may identify a set of client elements. Client computing device 130 may store set of client elements in a data storage (e.g., data storage 139). The set of client elements may be denoted by a set C where C={($c\_1$, $c\_2$, ..., $c\_n$)}. The set of client elements may comprise a first client element (e.g., $c\_1$), a second client element, (e.g., $c\_2$), ..., and a $n^{th}$ client element (e.g., $c\_n$). The set of client elements has a total of n client elements. Returning to the above example related to the security information sharing platform, a particular client element of the set of client elements may represent a particular security indicator. In some situations, some client elements in the set of client elements may be identical to and/or match some server elements in the set of server elements. For example, $s\_1$ and $c\_2$ may be the same element (e.g., the identical security indicator). In another example, $s\_4$ and $c\_20$ may refer to the identical element whereas $s\_5$ is unique to server computing device 140 (e.g., in other words, the set of client elements does not have an element identical to $s\_5$). This matching subset of the two sets may be referred to herein as an intersection and/or a private set intersection (PSI). In mathematics, the PSI can be denoted by the symbol "∩" where C ∩ S of two sets C and S is the set that contains all elements of C that also belong to S (or equivalently, all elements of S that also belong to C), but not other elements. For example, a PSI between the set of server elements and the set of client elements may comprise a subset of the set of server elements and a subset of the set of client elements where each server element of the subset of the set of server elements has an identical client element in the subset of the set of client elements.

Encrypt engine 132 may encrypt the set of client elements using an encryption scheme (e.g., asymmetric encryption key, a homomorphic encryption scheme, etc.), as discussed above with respect to encrypt engine 142.

Send engine 133 may send the encrypted set of client elements (or any subset thereof) to server computing device 140. Referring to FIG. 1, send engine 133 may send the encrypted set of client elements (or any subset thereof) to server computing device 140 via network 50.

Receive engine 134 may receive, from server computing device 140, the set of sever elements the set of client elements, the set of data objects, and/or the set of threshold conditions, as discussed herein with respect to send engine 143. The aforementioned sets (or any subset thereof) may be encrypted by encrypt engine 142, as discussed above, before sending them to client computing device 130. Referring to FIG. 1, receive engine 134 may receive the aforementioned sets (or any subset thereof) from server computing device 140 via network 50.

In some instances, it may be desired to share and/or have access to data objects associated with the PSI while hiding and/or blocking the access to the actual elements in the PSI. This technique may be useful, for example, in the context of a security information sharing platform. A private community (e.g., on client computing device 130) may be investigating a major attack campaign. The users of the community may privately exchange and/or share any security indicators within the community. The community may wish to know if the security information sharing platform (e.g., on server computing device 140) has any information about threat actors associated with this campaign (e.g., threat actors behind the security indicators in the campaign). However, revealing the security indicators that are privately shared within the community to the security information sharing platform may be inacceptable or undesirable. In addition, the platform needs to prevent its threat intelligence information from uncontrolled dispersion. It would be useful if the private community able to access the information about the threat actors without revealing the security indicators at issue. Access engine 135, as discussed in detail below, may enable sharing and/or providing access to data objects (e.g., information about the threat actors) associated with the PSI while hiding and/or blocking the access to the actual elements (e.g., security indicators) in the PSI.

Access engine 135 may access a particular data object of the encrypted set of data objects (e.g., the encrypted set of data objects received by receive engine 134 as discussed above) that is associated with the PSI (e.g., between the set of server elements and the set of client elements) without accessing the PSI (e.g., the actual elements in the PSI). In other words, the PSI may be inaccessible by client computing device 130. Users of client computing device 130 would not have access to the PSI and would not be able to find out which elements are included in the PSI. On the other hand a subset of the encrypted set of data objects that are associated with the PSI may be accessible by client computing device. For example, access engine 135 may determine whether a particular server element of the encrypted set of server elements (e.g., the encrypted set of server elements received by receive engine 134 as discussed above) belongs to the PSI. In response to determining that the particular server element belongs to the PSI, access engine 135 may access the particular data object (e.g., a threat actor) that is associated with the particular server element (e.g., a security indicator) without accessing the particular server element. Thus, the users private community may learn about the threat actor behind at least some of their security indicators submitted to the community although the user would not be able to find out which security indicator(s) is associated with this threat actor.

The PSI may be inaccessible by client computing device 130 such that a particular encrypted server (or client) element in the PSI is unable to be decrypted to retrieve a value corresponding to the particular encrypted server (or client) element. For example, a decryption key that can be used to decrypt the elements in the PSI may be hidden from or otherwise unknown to client computing device 130.

A data object associated with the PSI (e.g., the data object associated with at least one server element of the PSI) may be accessible by client computing device 130. In one example, encrypt engine 142, as discussed above, may encrypt the set of data objects using a symmetric key, and encrypt the set of server elements using an asymmetric encryption key that was used by client computing device 130 to encrypt the set of client elements. Access engine 135 may retrieve the symmetric key (e.g., that was used to encrypt the set of data objects) from the encrypted set of server elements (e.g., that was received by receive engine 134) and use that symmetric key to decrypt a particular data object if the particular data object is associated with the PSI.

In another example, encrypt engine 142, as discussed above, may encrypt the set of server elements and the set of data objects using a homomorphic encryption scheme. The same homomorphic encryption scheme may be also used by client computing device 130 to encrypt the set of client elements. Consider the following example: Client computing device 130 encrypts, via encrypt engine 132, the set of client elements using an additively homomorphic encryption scheme, and sends, via send engine 133, the encrypted set of client elements to server computing device 140. Server computing device 140 may encrypt the set of data objects using a symmetric, authenticated encryption scheme (e.g., a random symmetric key). Server computing device 140 may encrypt the set of server elements and the set of data objects together using the additively homomorphic encryption scheme (e.g., the same scheme that was used to encrypt the set of client elements), and send them to client computing device 130. Client computing device 130 may, via receive engine 134, receive the encrypted sets from server computing device 140. Client computing device 130 may then, via access engine 135, decrypt the received sets using the additively homomorphic encryption scheme (e.g., the same encryption scheme used to encrypt the set of client elements via encrypt engine 132). If a particular object is associated with the PSI, access engine 135 may retrieve (e.g., have access to) that data object from the decrypted sets. On the other hand, if the particular object is not associated with the PSI, access engine 135 may retrieve a random value instead from the decrypted sets.

In some implementations, access engine 135 may further control the access to the encrypted set of data objects using a threshold condition (e.g., at east one threshold condition received by receive engine 134 from server computing device 140). In this way, the threshold condition should be satisfied before any data objects that are associated with the PSI are made accessible by client computing device 130. A threshold condition may specify a condition that should be satisfied for client computing device 130 to gain access to a data object that is associated with the PSI. For example, the set denoted by S, may comprise $\{(s\_1\_1, s\_1\_2, \ldots, s\_1\_I_1, g\_1, t\_1), (s\_2\_1, s\_2\_2, \ldots, s\_2\_I_2, g\_2, t\_2), \ldots, (s\_m\_1, s\_m\_2, \ldots, s\_m\_I_m, g\_m, t\_m)\}$ where the set of server elements include s_1 (e.g., including s_1_1, s_1_2, ..., s_1_$I_1$), s_2 (e.g., including s_2_1, s_2_2, ..., s_2_$I_2$), ..., s_m (e.g. including s_m_1, s_m_2, ..., s_m_$I_m$), and the set of data objects include g_1, g_2, ..., g_m. In this example, a threshold condition t_1 may set a threshold condition for the server element s_1, a threshold condition t_2 may set a threshold condition for the server element s_2 and a threshold condition t_3 may set a threshold condition for the server element s_3, and so on. As such, a first data object g_1 (e.g., that is associated with the first server element s_1) may be accessible by client computing device 130 if (e.g., given that) the threshold condition t_1 is satisfied. Similarly, a second data object g_2 (e.g., that is associated with the second server element s_2) may be accessible by client computing device 130 if (e.g., given that) the threshold condition t_2 is satisfied, and so on.

Returning to the example related to the security information sharing platform, a threshold condition (e.g., t_1) may specify a threshold number (e.g., count) of security indicators in the PSI. The data object (e.g., g_1) may be accessible by client computing device 130 if the number of security indicators included in the PSI is above the threshold number, for example.

Data storage 139 and/or 149 may include a database to organize and store data. The database may reside in a single or multiple physical device(s) and in a single or multiple physical location(s). The database may store a plurality of types of data and/or files and associated data or file description, administrative information, or any other data.

Figure 2:
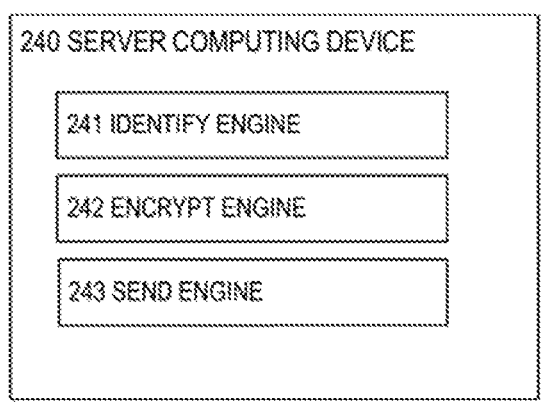
FIG. 2 is a block diagram depicting an example system for sending data objects associated with PSI.

FIG. 2 is a block diagram depicting an example system 200 for sending data objects associated with private set intersection (PSI). System 200 may comprise a server computing device 240 that comprises an identify engine 241, an encrypt engine 242, and a send engine 243, and/or other engines. Engines 241-243 represent engines 141-143, respectively.

Figure 3:
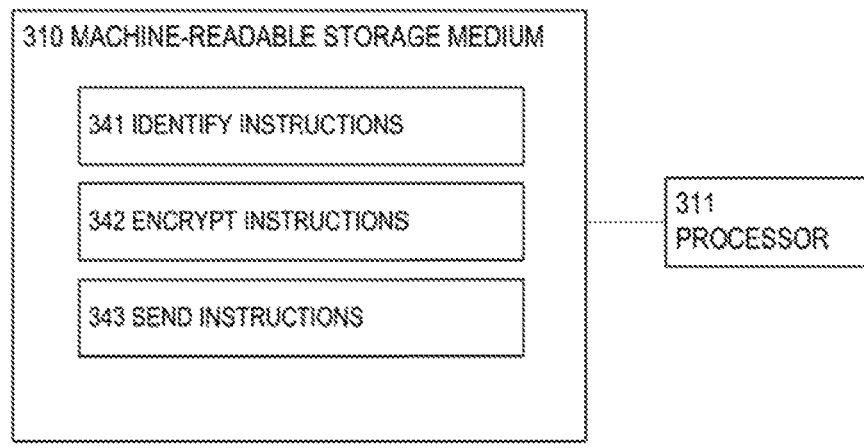
FIG. 3 is a block diagram depicting an example machine-readable storage medium comprising instructions executable by a processor for sending data objects associated with PSI.

FIG. 3 is a block diagram depicting an example machine-readable storage medium 310 comprising instructions executable by a processor for sending data objects associated with private set intersection (PSI).

In the foregoing discussion, engines 141-143 were described as combinations of hardware and programming. Engines 141-143 may be implemented in a number of fashions. Referring to FIG. 3, the programming may be processor executable instructions 341-343 stored on a machine-readable storage medium 310 and the hardware may include a processor 311 for executing those instructions. Thus, machine-readable storage medium 310 can be said to store program instructions or code that when executed by processor 311 implements system 100 of FIG. 1.

In FIG. 3, the executable program instructions in machine-readable storage medium 310 are depicted as identify instructions 341, encrypt instructions 342, and send instructions 343. Instructions 341-343 represent program instructions that, when executed, cause processor 311 to implement engines 141-143, respectively.

Figure 4:
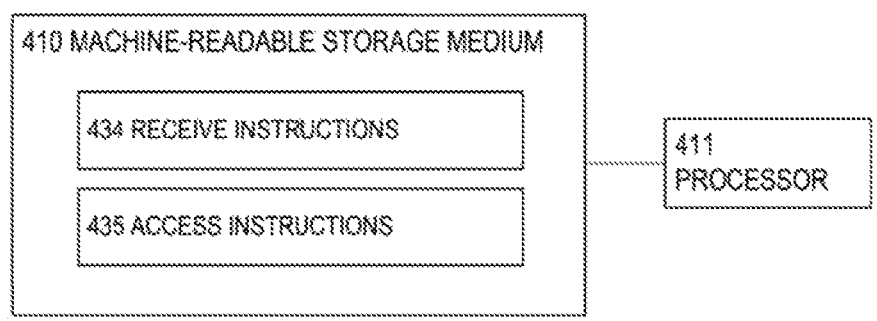
FIG. 4 is a block diagram depicting an example machine-readable storage medium comprising instructions executable by a processor for accessing data objects associated with PSI.

FIG. 4 is a block diagram depicting an example machine-readable storage medium 410 comprising instructions executable by a processor for accessing data objects associated with private set intersection (PSI).

In the foregoing discussion, engines 131-135 were described as combinations of hardware and programming. Engines 131-135 may be implemented in a number of fashions. Referring to FIG. 4, the programming may be processor executable instructions 434-435 stored on a machine-readable storage medium 410 and the hardware may include a processor 411 for executing those instructions. Thus, machine-readable storage medium 410 can be said to store program instructions or code that when executed by processor 411 implements system 100 of FIG. 1.

In FIG. 4, the executable program instructions in machine-readable storage medium 410 are depicted as receive instructions 434, and access instructions 435. Instructions 434-435 represent program instructions that, when executed, cause processor 411 to implement engines 134-135, respectively.

Figure 5:
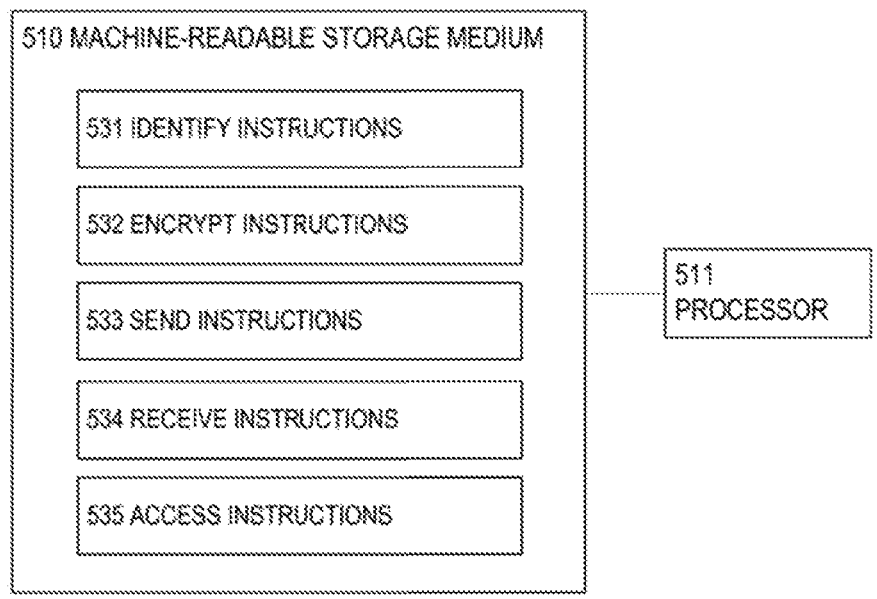

FIG. 5 is a block diagram depicting an example machine-readable storage medium 510 comprising instructions executable by a processor for accessing data objects associated with private set intersection (PSI).

Referring to FIG. 5, the programming may be processor executable instructions 531-535 stored on a machine-readable storage medium 510 and the hardware may include a processor 511 for executing those instructions. Thus, machine-readable storage medium 510 can be said to store program instructions or code that when executed by processor 511 implements system 100 of FIG. 1.

In FIG. 5, the executable program instructions in machine-readable storage medium 510 are depicted as identify instructions 531, encrypt instructions 532, send instructions 533, receive instructions 534, and access instructions 535. Instructions 531-535 represent program instructions that, when executed, cause processor 511 to implement engines 131-135, respectively.

Machine-readable storage medium 310, 410, or 510 may be any electronic, magnetic, optical, or other physical storage device that contains or stores executable instructions. In some implementations, machine-readable storage medium 310, 410, or 510 may be a non-transitory storage medium, where the term "non-transitory" does not encompass transitory propagating signals. Machine-readable storage medium 310, 410, or 510 may be implemented in a single device or distributed across devices. Likewise, processor 311, 411, or 511 may represent any number of processors capable of executing instructions stored by machine-readable storage medium 310, 410, or 510. Processor 311, 411, or 511 may be integrated in a single device or distributed across devices. Further, machine-readable storage medium 310, 410, or 510 may be fully or partially integrated in the same device as processor 311, 411, or 511, or it may be separate but accessible to that device and processor 311, 411, or 511.

In one example, the program instructions may be part of an installation package that when installed can be executed by processor 311, 411, or 511 to implement system 100. In this case, machine-readable storage medium 310, 410, or 510 may be a portable medium such as a floppy disk, CD, DVD, or flash drive or a memory maintained by a server from which the installation package can be downloaded and installed. In another, example, the program instructions may be part of an application or applications already installed. Here, machine-readable storage medium 310, 410, or 510 may include a hard disk, optical disk, tapes, solid state drives RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 341-343, and/or other instructions. As an alternative or in addition to retrieving and executing instructions, processor 311 may include at least one electronic circuit comprising a number of electronic components for performing the functionality of a least one of instructions 341-343, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 434-435, and/or other instructions. As an alternative or in addition to retrieving and executing instructions, processor 411 may include at least one electronic circuit comprising a number of electronic components for performing the functionality of at least one of instructions 434-435, and/or other instructions.

Processor 511 may be at least one central processing unit (CPU), microprocessor, and/or other hardware device suitable for retrieval and execution of instructions stored in machine-readable storage medium 510. Processor 511 may fetch, decode, and execute program instructions 531-535, and/or other instructions. As an alternative or in addition to retrieving and executing instructions, processor 511 may include at least one electronic circuit comprising a number of electronic components for performing the functionality of at least one of instructions 531-535, and/or other instructions.

Figure 6:
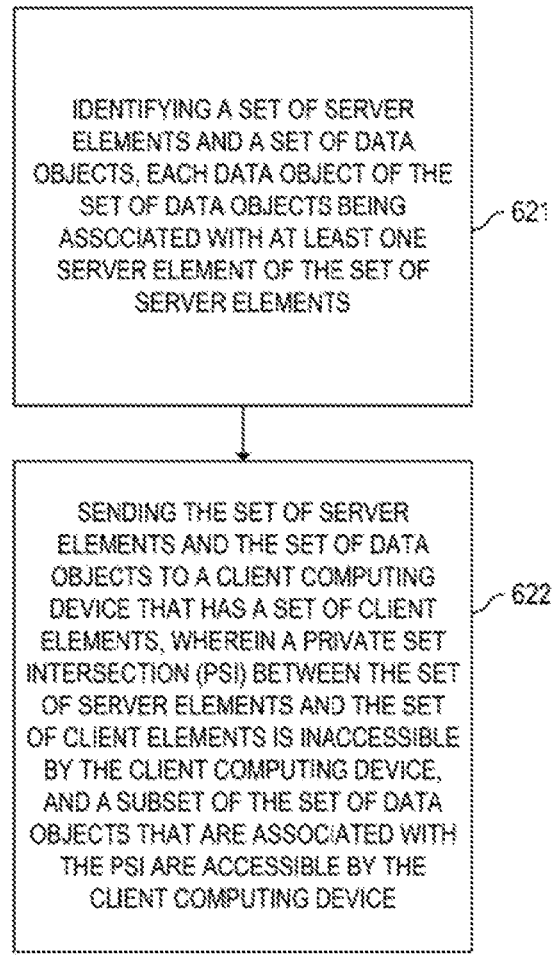
FIG. 6 is a flow diagram depicting an example method for sending data objects associated with PSI.

FIG. 6 is a flow diagram depicting an example method 600 for sending data objects associated with private set intersection (PSI). The various processing blocks and/or data flows depicted in FIG. 6 (and in the other drawing figures such as FIGS. 7-8) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 600 as illustrated (and described in greater detail below) is meant to be an example and, as such, should not be viewed as limiting. Method 600 may be implemented in the form of executable instructions stored on a machine-readable storage medium, such as storage medium 310, and/or in the form of electronic circuitry.

In block 621, method 600 may include identifying a set of server elements and a set of data objects, each data object of the set of data objects being associated with at least one server element of the set of server elements. Referring back to FIG. 1, identify engine 141 may be responsible for implementing block 621.

In block 622, method 600 may include sending the set of server elements and the set of data objects to a client computing device that has a set of client elements, wherein a private set intersection (PSI) between the set of server elements and the set of client elements is inaccessible by the client computing device, and a subset of the set of data objects that are associated with the PSI are accessible by the client computing device. Referring back to FIG. 1, send engine 143 may be responsible for implementing block 622.

Figure 7:
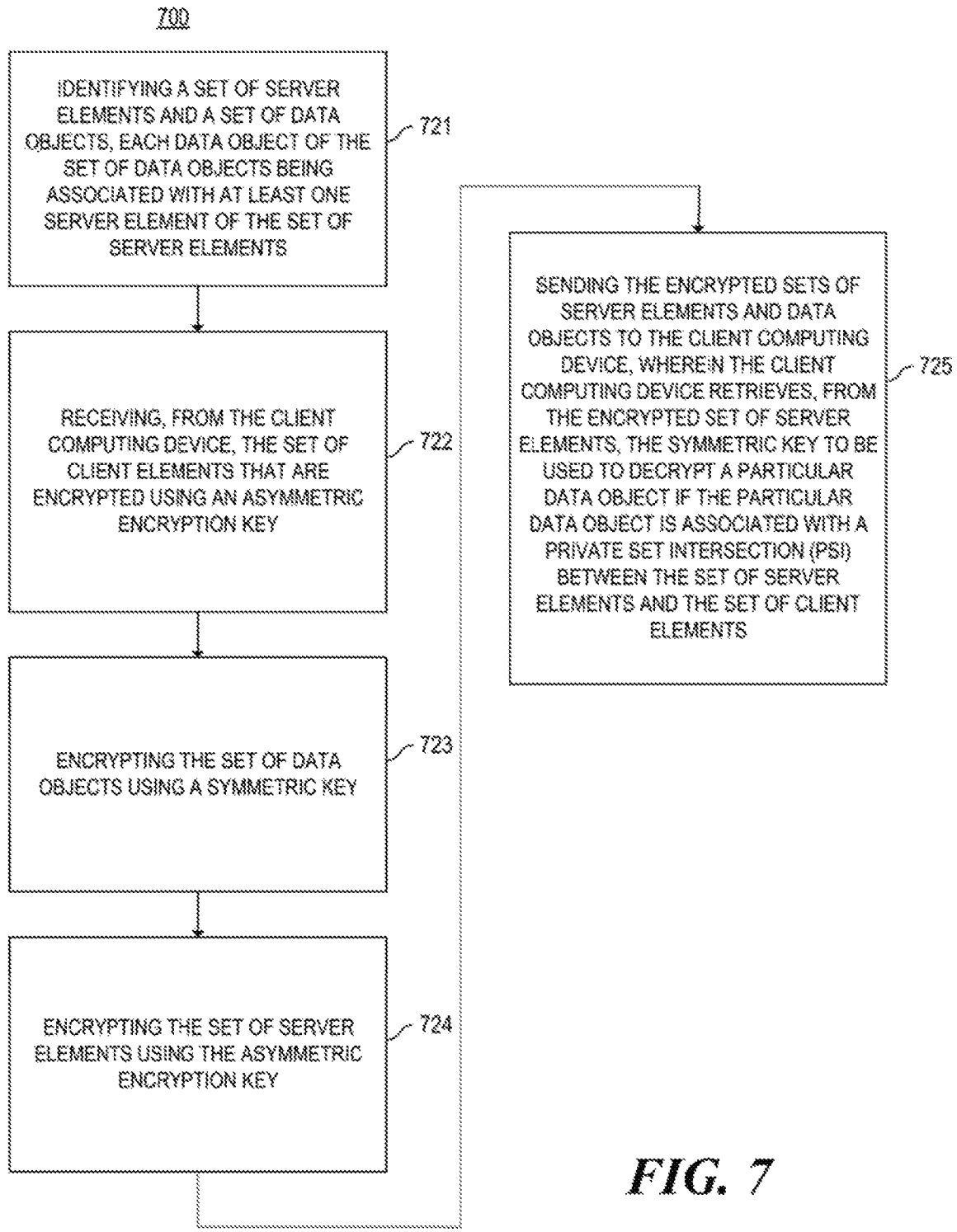
FIG. 7 is a flow diagram depicting example method for sending data objects associated with PSI.

FIG. 7 is a flow diagram depicting an example method 700 for sending data objects associated with private set intersection (PSI). Method 700 as illustrated (and described in greater detail below) is meant to be an example and, as such, should not be viewed as limiting. Method 700 may be implemented in the form of executable instructions stored on a machine-readable storage medium, such as storage medium 310, and/or in the form of electronic circuitry.

In block 721, method 700 may include identifying a set of server elements and a set of data objects, each data object of the set of data objects being associated with at least one server element of the set of server elements. Referring back to FIG. 1, identify engine 141 may be responsible for implementing block 721.

In block 722, method 700 may include receiving, from the client computing device, the set of client elements that are encrypted using an asymmetric encryption key. Referring back to FIG. 1, identify engine 141 may be responsible for implementing block 722.

In block 723, method 700 may include encrypting the set of data objects using a symmetric key. Referring back to FIG. 1, encrypt engine 142 may be responsible for implementing block 723.

In block 724, method 700 may include encrypting the set server elements using the asymmetric encryption key. Referring back to FIG. 1, encrypt engine 142 may be responsible for implementing block 724.

In block 725, method 700 may include sending the encrypted sets of server elements and data objects to the client computing device, wherein the client computing device retrieves, from the encrypted set of server elements, the symmetric key to be used to decrypt a particular data object if the particular data object is associated with a private set intersection (PSI) between the set of server elements and the set of client elements. Referring back to FIG. 1, send engine 143 may be responsible for implementing block 725.

Figure 8:
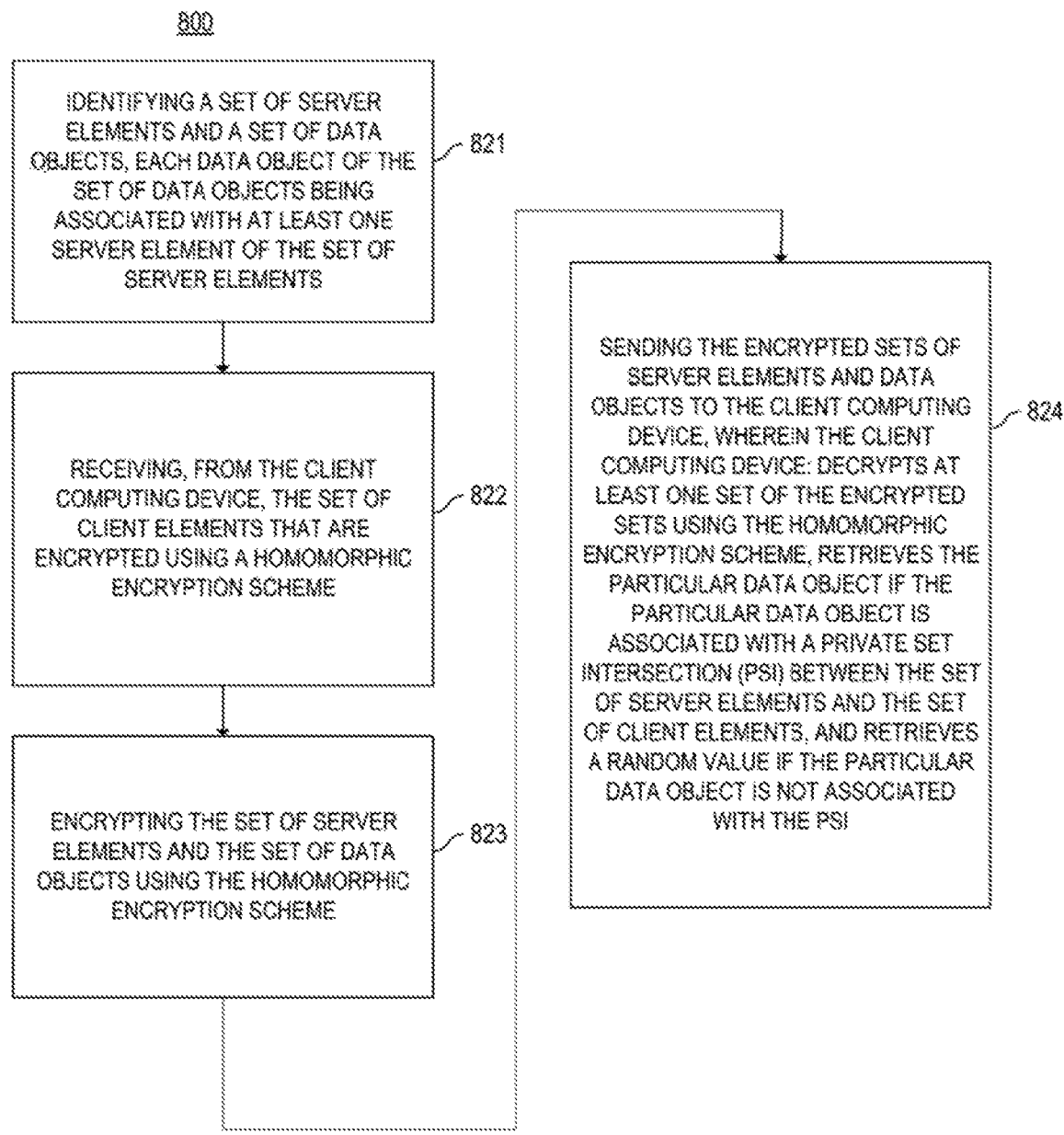
FIG. 8 is a flow diagram depicting an example method for sending data objects associated with PSI.

FIG. 8 is a flow diagram depicting an example method 800 for sending data objects associated with private set intersection (PSI). Method 800 as illustrated (and described in greater detail below) is meant to be an example and, as such, should not be viewed as limiting. Method 800 may be implemented in the form of executable instructions stored on a machine-readable storage medium, such as storage medium 310, and/or in the form of electronic circuitry.

In block 821, method 800 may include identifying a set of server elements and a set of data objects, each data object of the set of data objects being associated with at least one server element of the set of server elements. Referring back to FIG. 1, identify engine 141 may be responsible for implementing block 821.

In block 822, method 800 may include receiving, from the client computing device, the set of client elements that are encrypted using a homomorphic encryption scheme. Referring back to FIG. 1, identify engine 141 may be responsible for implementing block 822.

In block 823, method 800 may include encrypting the set of server elements and the set of data objects using the homomorphic encryption scheme. Referring back to FIG. 1, encrypt engine 142 may be responsible for implementing block 823.

In block 824, method 800 may include sending the encrypted sets of server elements and data objects to the client computing device. Referring back to FIG. 1, send engine 143 may be responsible for implementing block 824. The client computing device may: decrypt at least one set of the encrypted sets using the homomorphic encryption scheme, retrieve the particular data object if the particular data object is associated with a private set intersection (PSI) between the set of server elements and the set of client elements, and retrieve a random value if the particular data object is not associated with the PSI.

The foregoing disclosure describes a number of example implementations for data objects associated with private set intersection (PSI). The disclosed examples may include systems, devices, computer-readable storage media, and methods for data objects associated with PSI. For purposes of explanation, certain examples are described with reference to the components illustrated in FIGS. 1-5. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 6-8 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for distributing data objects associated with private set intersection (PSI) from a server computing device to a client computing device, the method comprising:
 identifying, by the server computing device, a set of server elements and a set of data objects of the server computing device, each data object of the set of data objects of the server computing device being associated with at least one server element of the set of server elements;
 sending, by the server computing device, the set of server elements and the set of data objects to the client computing device that has a set of client elements and a set of data objects, each data object of the set of data objects of the client computing device being associated with at least one client element of the set of client elements, wherein the set of data objects of the client computing device are inaccessible by the server computing device and wherein a private set intersection (PSI) between the set of server elements and the set of client elements is inaccessible by the client computing device, and a subset of the set of data objects of the server computing device that are associated with the PSI are accessible by the client computing device;

receiving, by the server computing device, from the client computing device, the set of client elements that are encrypted using an asymmetric encryption key;

encrypting, by the server computing device, the set of data objects of the server computing device using a symmetric key;

encrypting, by the server computing device, the set of server elements using the asymmetric encryption key; and sending, by the server computing device, the encrypted sets of server elements and data objects of the server computing device to the client computing device, wherein the server computing device provides to the client computing device, from the encrypted set of server elements, the symmetric key to be used to decrypt a particular data object of the server computing device if the particular data object of the server computing device is associated with the PSI.

2. The method of claim 1, wherein the PSI comprises a subset of the set of server elements and a subset of the set of client elements, and each server element of the subset of the set of server elements has an identical client element in the subset of the set of client elements.

3. The method of claim 2, wherein the subset of the set of data objects of the server computing device are associated with the subset of the set of server elements in the PSI.

4. The method of claim 1, further comprising:

receiving, by the server computing device, from the client computing device, the set of client elements that are encrypted using a homomorphic encryption scheme;

encrypting, by the server computing device, the set of server elements and the set of data objects of the server computing device using the homomorphic encryption scheme; and sending, by the server computing device, the encrypted sets of server elements and data objects of the server computing device to the client computing device, wherein the client computing device:
  decrypts at least one set of the encrypted sets of server elements and data objects of the server computing device using the homomorphic encryption scheme,
  retrieves the particular data object of the server computing device if the particular data object of the server computing device is associated with the PSI, and
  retrieves a random value if the particular data object of the server computing device is not associated with the PSI.

5. The method of claim 1, wherein a particular server element of the set of server elements represents a particular security indicator that comprises at least one observable, and the server computing device represents a security information sharing platform that enables sharing of security information among a plurality of users.

6. The method of claim 5, wherein a particular data object of the server computing device that is associated with the particular server element comprises at least one of: a threat actor, an organization, an industry sector, a community, a domain name, a timestamp, or a level of severity of the particular security indicator.

7. A system for distributing data objects associated with private set intersection (PSI), comprising:

a server computing device comprising a processor that:
  identifies a set of server elements and a set of data objects of the server computing device, each data object of the set of data objects being associated with at least one server element of the set of server elements;
  identifies a threshold condition for the set of server elements;
  encrypts the set of server elements and the set of data objects of the server computing device;
  sends the encrypted set of server elements, the encrypted set of data objects of the server computing device, and the threshold condition to a client computing device that has a set of client elements, wherein a private set intersection (PSI) between the set of server elements and the set of client elements is inaccessible by the client computing device, and wherein a subset of the set of data objects of the server computing device that are associated with the PSI are accessible by the client computing device if the threshold condition is satisfied;
  receives, from the client computing device, the set of client elements that are encrypted using an asymmetric encryption key;
  encrypts the set of data objects of the server computing device using a symmetric key;
  encrypts the set of server elements using the asymmetric encryption key; and
  sends the encrypted sets of server elements and data objects of the server computing device to the client computing device, wherein the server computing device provides to the client computing device, from the encrypted set of server elements, the symmetric key to be used to decrypt a particular data object of the server computing device if the particular data object of the server computing device is associated with the PSI.

8. The system of claim 7, wherein the processor further:
identifies a first threshold condition associated with a first server element of the PSI, and a second threshold condition associated with a second server element of the PSI; and
sends the first and second threshold conditions to the client computing device, wherein a first data object of the server computing device that is associated with the first server element is accessible by the client computing device if the first threshold condition is satisfied, and wherein a second data object of the server computing device that is associated with the second server element is inaccessible by the client computing device if the second threshold condition is not satisfied.

9. The system of claim 7, wherein the processor further:
randomizes an order of the set of server elements and the set of data objects of the server computing device before sending the set of server elements and the set of data objects of the server computing device to the client computing device.

10. The system of claim 7, wherein the processor further:
receives a particular security indicator from the client computing device, the particular security indicator comprising at least one observable;
identifies the particular security indicator in the set of server elements, and the threshold condition associated with the particular security indicator, the threshold condition specifying a threshold number of security indicators in the PSI;

encrypts a particular data object of the server computing device that is associated with the particular security indicator; and sends the particular data object of the server computing device to the client computing device, wherein the particular data object of the server computing device is accessible by the client computing device if the threshold condition is satisfied.

11. The system of claim 7, wherein the client computing device has a set of client elements and a set of data objects, each data object of the set of data objects of the client computing device being associated with at least one client element of the set of client elements, wherein the set of data objects of the client computing device are inaccessible by the server computing device.

12. The system of claim 7, wherein the PSI comprises a subset of the set of server elements and a subset of the set of client elements, and each server element of the subset of the set of server elements has an identical client element in the subset of the set of client elements.

13. The system of claim 12, wherein the subset of the set of data objects of the server computing device are associated with the subset of the set of server elements in the PSI.

14. The system of claim 7, wherein the processor further:
receives, from the client computing device, the set of client elements that are encrypted using a homomorphic encryption scheme;
encrypts the set of server elements and the set of data objects of the server computing device using the homomorphic encryption scheme; and
sends the encrypted sets of server elements and data objects of the server computing device to the client computing device, wherein the client computing device:
decrypts at least one set of the encrypted sets of server elements and data objects of the server computing device using the homomorphic encryption scheme,
retrieves the particular data object of the server computing device if the particular data object of the server computing device is associated with the PSI, and
retrieves a random value if the particular data object of the server computing device is not associated with the PSI.

15. A non-transitory, computer-readable medium comprising a set of instructions stored therein which, when executed by a processor, causes the processor to distribute data objects associated with private set intersection (PSI) from a server computing device to a client computing device by:
identifying, by the server computing device, a set of server elements and a set of data objects of the server computing device, each data object of the set of data objects of the server computing device being associated with at least one server element of the set of server elements;
sending, by the server computing device, the set of server elements and the set of data objects to the client computing device that has a set of client elements and a set of data objects, each data object of the set of data objects of the client computing device being associated with at least one client element of the set of client elements, wherein the set of data objects of the client computing device are inaccessible by the server computing device and wherein a private set intersection (PSI) between the set of server elements and the set of client elements is inaccessible by the client computing device, and a subset of the set of data objects of the server computing device that are associated with the PSI are accessible by the client computing device;
receiving, by the server computing device, from the client computing device, the set of client elements that are encrypted using an asymmetric encryption key;
encrypting, by the server computing device, the set of data objects of the server computing device using a symmetric key;
encrypting, by the server computing device, the set of server elements using the asymmetric encryption key; and
sending, by the server computing device, the encrypted sets of server elements and data objects of the server computing device to the client computing device, wherein the server computing device provides to the client computing device, from the encrypted set of server elements, the symmetric key to be used to decrypt a particular data object of the server computing device if the particular data object of the server computing device is associated with the PSI.

16. The non-transitory, computer-readable medium of claim 15, wherein the PSI comprises a subset of the set of server elements and a subset of the set of client elements, and each server element of the subset of the set of server elements has an identical client element in the subset of the set of client elements.

17. The non-transitory, computer-readable medium of claim 16, wherein the subset of the set of data objects of the server computing device are associated with the subset of the set of server elements in the PSI.

18. The non-transitory, computer-readable medium of claim 15, wherein the instructions further cause the processor to:
receive, by the server computing device, from the client computing device, the set of client elements that are encrypted using a homomorphic encryption scheme;
encrypt, by the server computing device, the set of server elements and the set of data objects of the server computing device using the homomorphic encryption scheme; and
send, by the server computing device, the encrypted sets of server elements and data objects of the server computing device to the client computing device, wherein the client computing device:
decrypts at least one set of the encrypted sets of server elements and data objects of the server computing device using the homomorphic encryption scheme,
retrieves the particular data object of the server computing device if the particular data object of the server computing device is associated with the PSI, and
retrieves a random value if the particular data object of the server computing device is not associated with the PSI.

19. The non-transitory, computer-readable medium of claim 15, wherein a particular server element of the set of server elements represents a particular security indicator that comprises at least one observable, and the server computing device represents a security information sharing platform that enables sharing of security information among a plurality of users.

20. The non-transitory, computer-readable medium of claim 19, wherein a particular data object of the server computing device that is associated with the particular server element comprises at least one of: a threat actor, an organization, an industry sector, a community, a domain name, a timestamp, or a level of severity of the particular security indicator.

\* \* \* \* \*